US011295323B2

(12) United States Patent
Horesh et al.

(10) Patent No.: US 11,295,323 B2
(45) Date of Patent: Apr. 5, 2022

(54) SYSTEMS AND METHODS USING FINANCIAL INFORMATION TO GENERATE A SOCIAL GRAPH AND DETERMINE PRODUCT AND OTHER OFFERINGS BASED ON CONNECTIONS WITHIN THE SOCIAL GRAPH

(71) Applicant: Intuit Inc., Mountain View, CA (US)

(72) Inventors: Yair Horesh, Tel Aviv (IL); Yehezkel Shraga Resheff, Tel Aviv (IL); Shimon Shahar, Hod Hasharon (IL); Tzvika Barenholz, Tel Aviv (IL)

(73) Assignee: Intuit Inc., Mountain View, CA (US)

( * ) Notice: Subject to any disclaimer, the term of this patent is extended or adjusted under 35 U.S.C. 154(b) by 104 days.

(21) Appl. No.: 16/710,649

(22) Filed: Dec. 11, 2019

(65) Prior Publication Data

US 2021/0182876 A1  Jun. 17, 2021

(51) Int. Cl.
  *G06Q 30/02* (2012.01)
  *G06Q 50/00* (2012.01)
(52) U.S. Cl.
  CPC ........ *G06Q 30/0201* (2013.01); *G06Q 50/01* (2013.01)
(58) Field of Classification Search
  None
  See application file for complete search history.

(56) References Cited

U.S. PATENT DOCUMENTS

| 9,990,621 | B1* | 6/2018 | Ng | G06Q 20/202 |
| 2007/0094066 | A1* | 4/2007 | Kumar | G06Q 30/0202 706/61 |
| 2011/0276396 | A1* | 11/2011 | Rathod | H04L 51/066 705/14.49 |
| 2013/0073473 | A1* | 3/2013 | Heath | G06Q 30/06 705/319 |
| 2014/0222636 | A1* | 8/2014 | Cheng | G06Q 50/01 705/35 |
| 2014/0257922 | A1* | 9/2014 | Jouhikainen | G06Q 30/0201 705/7.29 |
| 2015/0120521 | A1* | 4/2015 | Howe | G06Q 40/00 705/35 |
| 2019/0205481 | A1* | 7/2019 | Gutnik | G06F 16/9024 |

OTHER PUBLICATIONS

Lee et al, Connected Consumption: The Hidden Networks of Consumption, 2009 (Year: 2009).*
Kanaujia et al., Recommendation system for financial analytics, 2016 (Year: 2016).*

* cited by examiner

*Primary Examiner* — Mohamed N El-Bathy
(74) *Attorney, Agent, or Firm* — DLA Piper LLP (US)

(57) ABSTRACT

Systems and methods that may be used to generate and use a social graph generated by user financial transaction data (i.e., a financial transaction-based social graph). Connections and other data within the financial transaction-based social graph can be used for targeted product offerings, other offerings, and or advertisements via e.g., collaborative filtering and user segmentation and profiling.

14 Claims, 6 Drawing Sheets

SYSTEMS AND METHODS USING FINANCIAL INFORMATION TO GENERATE A SOCIAL GRAPH AND DETERMINE PRODUCT AND OTHER OFFERINGS BASED ON CONNECTIONS WITHIN THE SOCIAL GRAPH

DETAILED DESCRIPTION OF SEVERAL EMBODIMENTS

Figure 1:
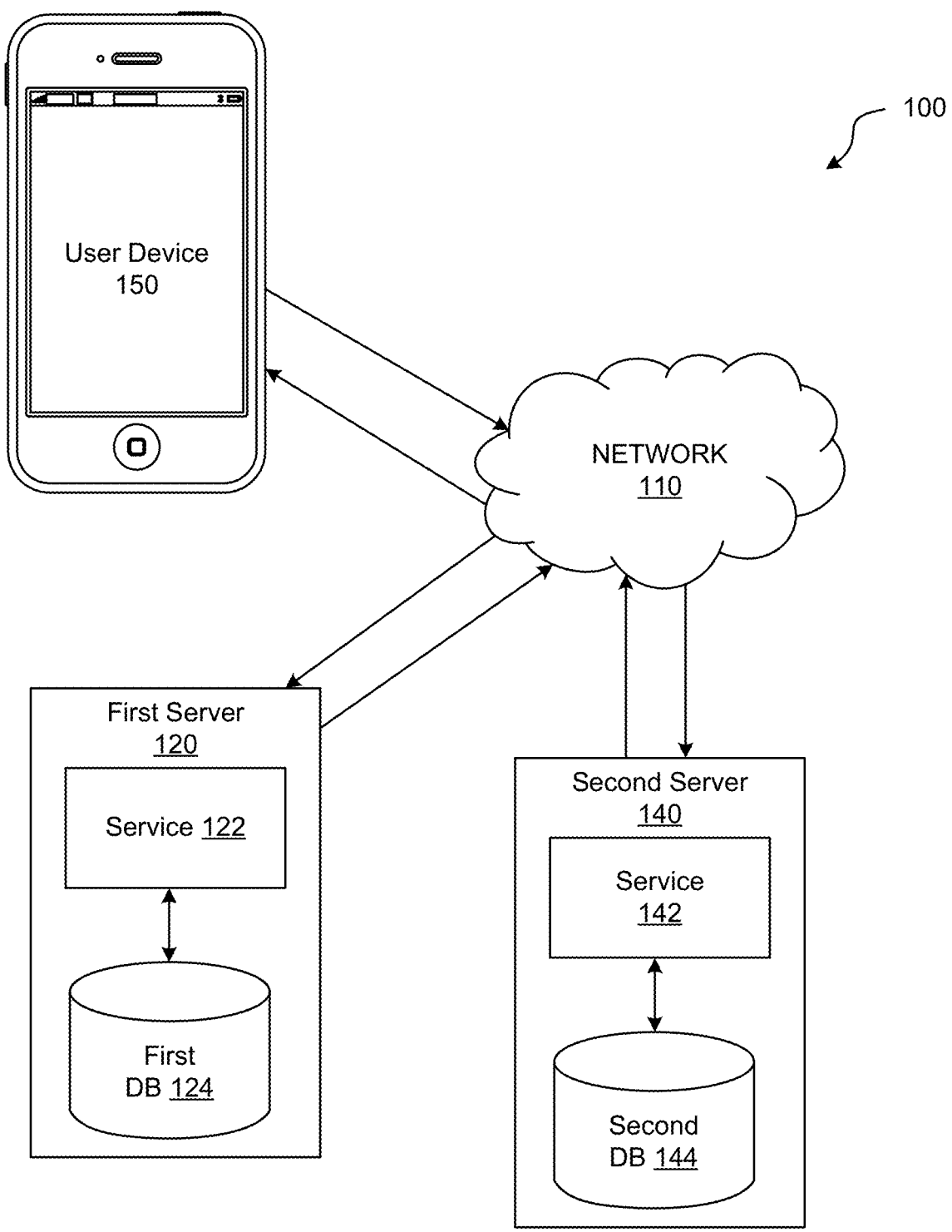
FIG. 1 shows an example of a system configured to construct and use a financial transaction-based social graph in accordance with an embodiment of the present disclosure.

Embodiments described herein may be used to generate and use a social graph generated by user financial transaction data (i.e., a financial transaction-based social graph). Connections and other data within the financial transaction-based social graph can be used for targeted product offerings, other offerings, and or advertisements via e.g., collaborative filtering and user segmentation and profiling.

For instance, the saying "tell me who your fiends are and I will tell you who you are" embodies the intuitive understanding that social ties reflect consumer's individual identities. Indeed, this relationship is heavily utilized by social networking organizations to promote and improve their product offerings. The inventors have determined that there is a need and desire for generating and using a social graph that is based on users' financial transaction data to determine connections and the strength of the connections between the users that may be subsequently used for other purposes such as e.g., collaborative filtering and or user segmentation and profiling.

In one or more embodiments disclosed herein, knowledge of social behavior and norms are used to extract and reverse engineer social relationships from financial transaction history. The inventors have determined that individuals in tight relationships (e.g., friends) often make purchases together and at times this is reflected by the occurrence of purchases from the same merchant at approximately the same time (e.g., both bought coffee at the same Starbucks® at the same time) (referred to herein as the co-occurrence of transactions). Moreover, the inventors have determined that bill-splitting (i.e., when two or more individuals split a bill e.g., at a restaurant) is a unique signal that indicates with great certainty what the users have done and what type of relationship them may have with each other.

In addition, the disclosed principles may use different weights associated with the events (e.g., co-occurrence of transactions may be a weak connection, while bill-splitting may be a stronger connection) to detect the existence and strength of connections between individual users. This in turn allows the disclosed principles to construct a financial transaction-based social graph that bolsters several different uses of this new social information.

An example computer implemented method for generating and using a financial transaction-based social graph is performed on a computing device and may comprise: inputting financial transaction data associated with a plurality of users; organizing the input financial transactions based on an approximate time and location of the transactions; determining from the organized input financial transactions whether one or more users experienced a same transaction event; determining a connection between the one or more users when it is determined that the one or more users experienced the same transaction event; generating the financial transaction-based social graph using data that identifies the users that experienced the same transaction event and a connection strength between the users that experienced the same transaction event; querying the financial transaction-based social graph; and using the connections and user data in the financial transaction-based social graph in one or more of a collaborative filtering process or a process for profiling one or more users for a product offering.

FIG. 1 shows an example of a system 100 configured to implement the process for constructing and using a financial transaction-based social graph according to an embodiment of the present disclosure. System 100 may include a first server 120, second server 140, and/or a user device 150. First server 120, second server 140, and/or user device 150 may be configured to communicate with one another through network 110. For example, communication between the elements may be facilitated by one or more application programming interfaces (APIs). APIs of system 100 may be proprietary and/or may be examples available to those of ordinary skill in the art such as Amazon® Web Services (AWS) APIs or the like. Network 110 may be the Internet and/or other public or private networks or combinations thereof.

First server 120 may be configured to implement a first service 122, which in one embodiment may be used to input financial transaction data via network 110 from one or more databases 124, 144, the second server 140 and/or user device 150. For example, first server 120 may execute the process for constructing and using a financial transaction-based social graph according to the disclosed principles using financial transaction data stored in database 124, database 144 and or received from second server 140 and/or user device 150. First service 122 or second service 142 may implement an information service, which may maintain data concerning user financial transactions. The information service may be any network 110 accessible service that maintains user financial transactions. For example, the information service may include Mint® by Intuit® of Mountain View Calif.

User device 150 may be any device configured to present user interfaces and receive inputs thereto. For example, user device 150 may be a smartphone, personal computer, tablet, laptop computer, or other device.

First server 120, second server 140, first database 124, second database 144, and user device 150 are each depicted as single devices for ease of illustration, but those of ordinary skill in the art will appreciate that first server 120, second server 140, first database 124, second database 144, and/or user device 150 may be embodied in different forms for different implementations. For example, any or each of first server 120 and second server 140 may include a plurality of servers or one or more of the first database 124 and second database 144. Alternatively, the operations performed by any or each of first server 120 and second server 140 may be performed on fewer (e.g., one or two) servers. In another example, a plurality of user devices 150 may communicate with first server 120 and/or second server 140. A single user may have multiple user devices 150, and/or there may be multiple users each having their own user device(s) 150.

Figure 2:
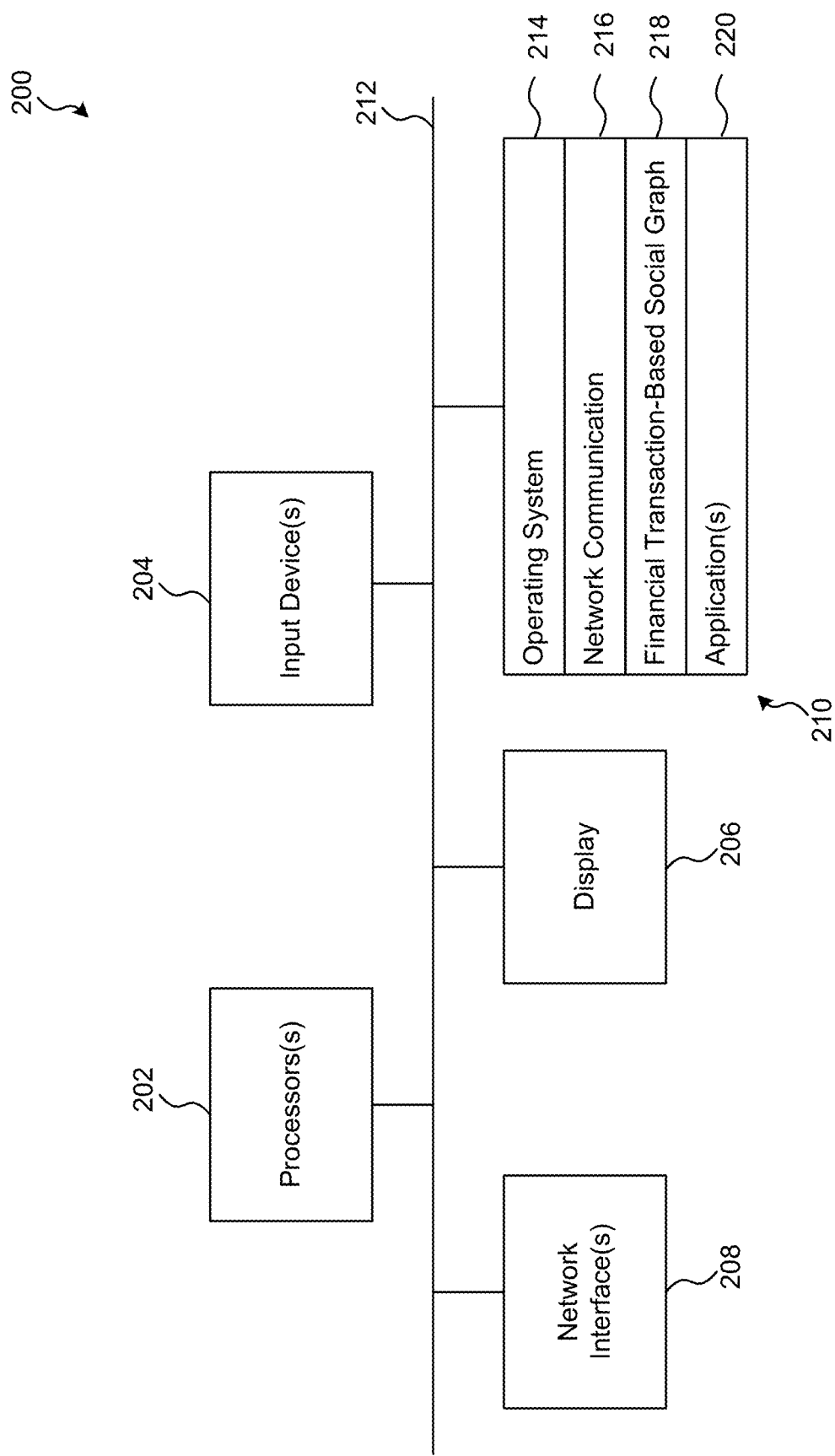
FIG. 2 shows a server device according to an embodiment of the present disclosure.

FIG. 2 is a block diagram of an example computing device 200 that may implement various features and processes as described herein. For example, computing device 200 may function as first server 120, second server 140, or a portion or combination thereof in some embodiments. The computing device 200 may be implemented on any electronic device that runs software applications derived from compiled instructions, including without limitation personal computers, servers, smart phones, media players, electronic tablets, game consoles, email devices, etc. In some implementations, the computing device 200 may include one or more processors 202, one or more input devices 204, one or more display devices 206, one or more network interfaces 208, and one or more computer-readable media 210. Each of these components may be coupled by a bus 212.

Display device 206 may be any known display technology, including but not limited to display devices using Liquid Crystal Display (LCD) or Light Emitting Diode (LED) technology. Processor(s) 202 may use any known processor technology, including but not limited to graphics processors and multi-core processors. Input device 204 may be any known input device technology, including but not limited to a keyboard (including a virtual keyboard), mouse, track ball, and touch-sensitive pad or display. Bus 212 may be any known internal or external bus technology, including but not limited to ISA, EISA, PCI, PCI Express, NuBus, USB, Serial ATA or FireWire. Computer-readable medium 210 may be any medium that participates in providing instructions to processor(s) 202 for execution, including without limitation, non-volatile storage media (e.g., optical disks, magnetic disks, flash drives, etc.), or volatile media (e.g., SDRAM, ROM, etc.).

Computer-readable medium 210 may include various instructions 214 for implementing an operating system (e.g., Mac OS®, Windows®, Linux). The operating system may be multi-user, multiprocessing, multitasking, multithreading, real-time, and the like. The operating system may perform basic tasks, including but not limited to: recognizing input from input device 204; sending output to display device 206; keeping track of files and directories on computer-readable medium 210; controlling peripheral devices (e.g., disk drives, printers, etc.) which can be controlled directly or through an I/O controller; and managing traffic on bus 212. Network communications instructions 216 may establish and maintain network connections (e.g., software for implementing communication protocols, such as TCP/IP, HTTP, Ethernet, telephony, etc.).

Financial transaction-based social graph instructions 218 may include instructions that implement the disclosed process for constructing and using a financial transaction-based social graph as described herein.

Application(s) 220 may be an application that uses or implements the processes described herein and/or other processes. The processes may also be implemented in operating system 214.

The described features may be implemented in one or more computer programs that may be executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program may be written in any form of programming language (e.g., Objective-C, Java), including compiled or interpreted languages, and it may be deployed in any form, including as a stand-alone program or as a module, component, subroutine, or other unit suitable for use in a computing environment. In one embodiment, this may include Python.

Suitable processors for the execution of a program of instructions may include, by way of example, both general and special purpose microprocessors, and the sole processor or one of multiple processors or cores, of any kind of computer. Generally, a processor may receive instructions and data from a read-only memory or a random access memory or both. The essential elements of a computer may include a processor for executing instructions and one or more memories for storing instructions and data. Generally, a computer may also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data may include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory may be supplemented by, or incorporated in, ASICs (application-specific integrated circuits).

To provide for interaction with a user, the features may be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features may be implemented in a computer system that includes a back-end component, such as a data server, or that includes a middleware component, such as an application server or an Internet server, or that includes a front-end component, such as a client computer having a graphical user interface or an Internet browser, or any combination thereof. The components of the system may be connected by any form or medium of digital data communication such as a communication network. Examples of communication networks include, e.g., a telephone network, a LAN, a WAN, and the computers and networks forming the Internet.

The computer system may include clients and servers. A client and server may generally be remote from each other and may typically interact through a network. The relationship of client and server may arise by virtue of computer programs running on the respective computers and having a client-server relationship to each other.

One or more features or steps of the disclosed embodiments may be implemented using an API. An API may define one or more parameters that are passed between a calling application and other software code (e.g., an operating system, library routine, function) that provides a service, that provides data, or that performs an operation or a computation.

The API may be implemented as one or more calls in program code that send or receive one or more parameters through a parameter list or other structure based on a call convention defined in an API specification document. A parameter may be a constant, a key, a data structure, an object, an object class, a variable, a data type, a pointer, an array, a list, or another call. API calls and parameters may be implemented in any programming language. The programming language may define the vocabulary and calling convention that a programmer will employ to access functions supporting the API.

In some implementations, an API call may report to an application the capabilities of a device running the application, such as input capability, output capability, processing capability, power capability, communications capability, etc.

Figure 3:
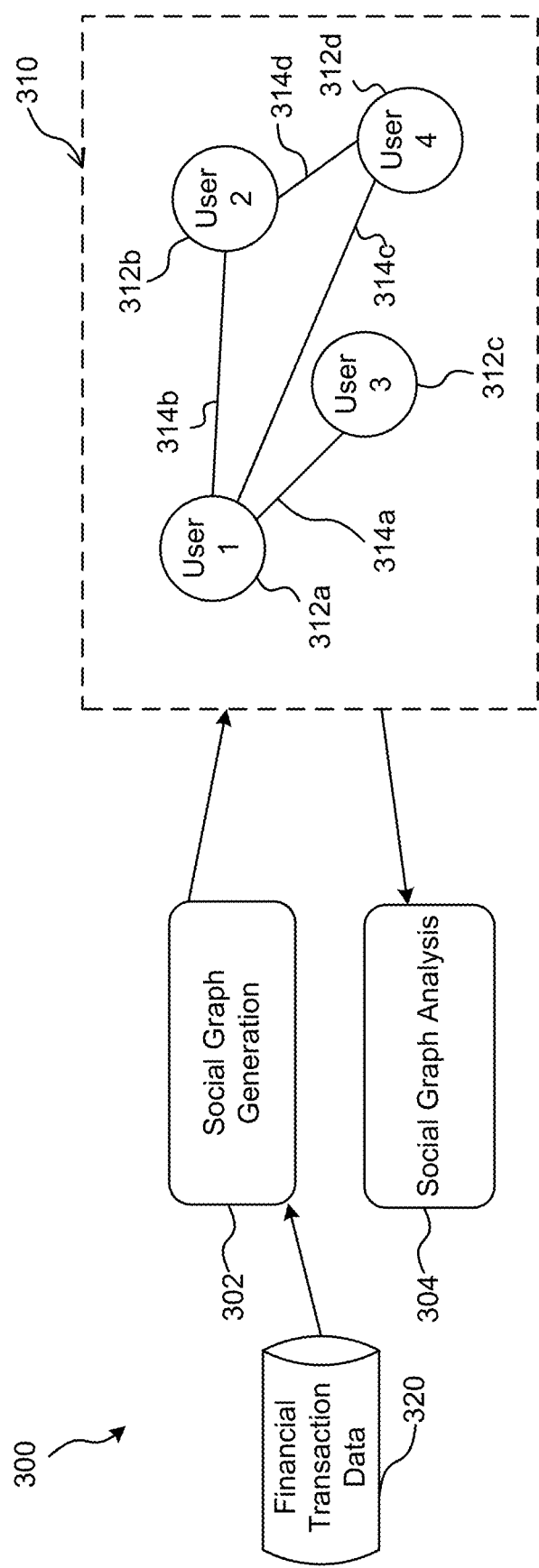
FIG. 3 shows a functional block diagram of an example process for constructing and using a financial transaction-based social graph according to an embodiment of the present disclosure.

FIG. 3 illustrates a functional block diagram of an example process 300 for constructing and using a financial transaction-based social graph according to an embodiment of the present disclosure. In one embodiment, system 100 may perform some or all of the processing illustrated in FIG. 3. For example, first server 120 may perform the social graph generation process 302 and or the social graph analysis process 304 discussed in detail below with respect to FIGS. 4-6. Moreover, during the execution of the social graph generation process 302, first server 120 may input financial transaction data from a database 320, which may be the first database 124 and or second database 144.

In addition, the process 300 may create, maintain and utilize a social graph 310 in accordance with the disclosed principles. The social graph 310 may be stored in one or more of the first database 124 and or second database 144. The social graph 310 may comprise one or more nodes 312a, 312b, 312c, 312d associated with various users User 1, User 2, User 3, User 4 identified by the input financial transaction data. The social graph 310 may comprise one or more connections 314a, 314b, 314c, 314d between the one or more nodes 312a, 312b, 312c, 312d. In the illustrated example, the first node 312a associated with User 1 is connected to the third node 312c associated with User 3 via connection 314a, the second node 312b associated with User 2 via connection 314b, and the fourth node 312d associated with User 4 via connection 314c. In addition, in the illustrated example, the second node 312b associated with User 2 is connected to the fourth node 312d associated with User 4 via connection 314d. The creation, contents and use of the social graph 310 are described in more detail below with respect to FIGS. 4-6.

Figure 4:
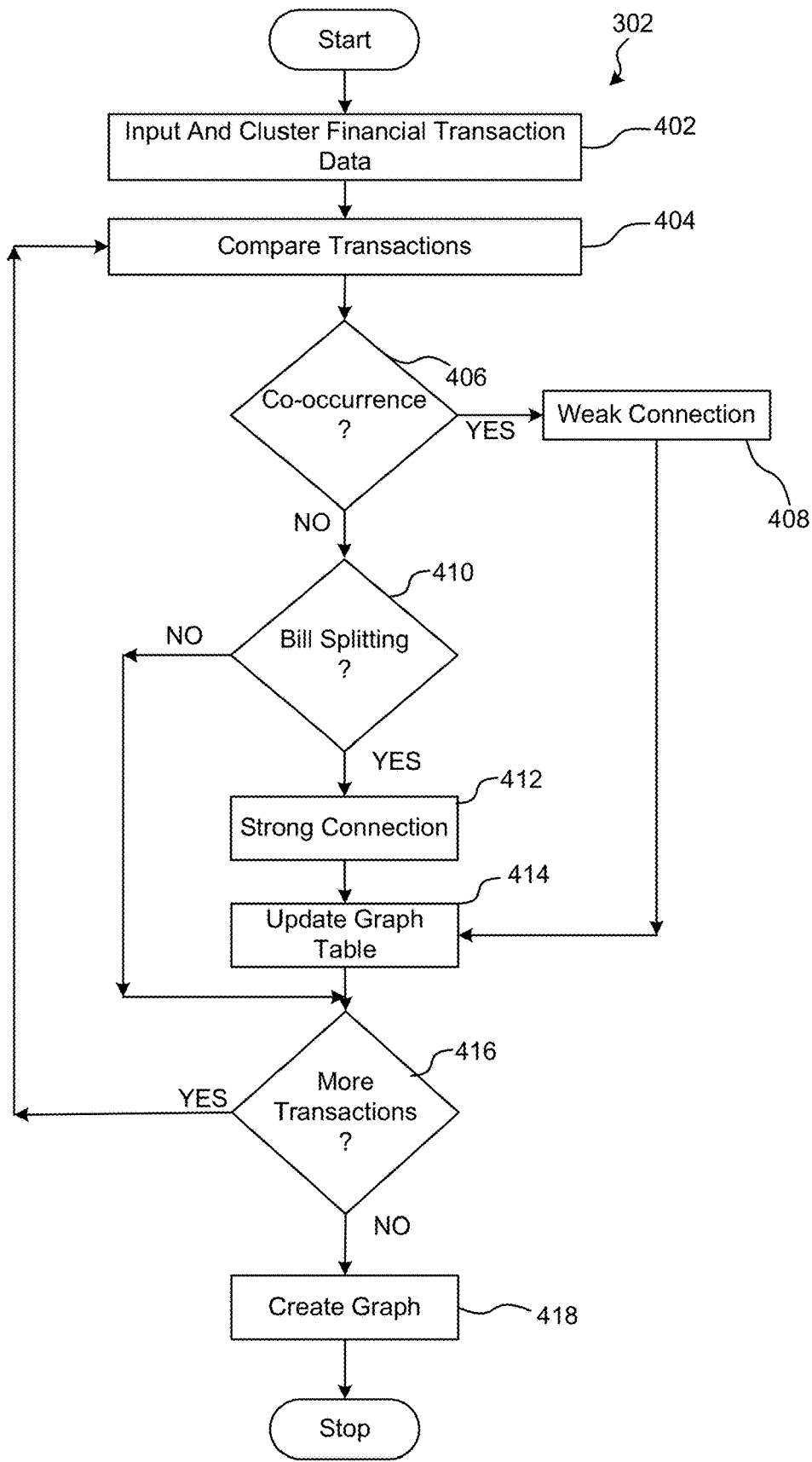
FIG. 4 shows an example social graph generation process that may be utilized in the process for constructing and using a financial transaction-based social graph shown in FIG. 3.

FIG. 4 shows an example social graph generation process 302 that may be utilized in the process 300 for constructing and using a financial transaction-based social graph shown in FIG. 3. As discussed in more detail below, social graph generation process 302 may be used to create a social graph (e.g., graph 310) from the mining and analysis of financial transactions of various users within the system 100. As such, process 302 may begin by inputting financial transaction data from database 320 at step 402. In one embodiment, the transaction data may be maintained in a table and may contain some or all of the following information:
<user identifier, transaction date, transaction time, transaction amount, merchant identifier, merchant location, general description>

It should be appreciated that some or all of the listed information may be required because each financial institution uses its own transaction clearinghouse, which may described transactions differently than other clearinghouses. Thus, to ensure that the process 302 has the proper information to form connections between users and their transactions, specific data such as transaction date, time and location may be used to properly catalog the input transactions. In one or more embodiments, the general description may be used to help characterize the transaction. The processing at step 402 may also include indexing each transaction and or grouping/clustering transactions that occurred at the same location and at approximately the same time into a clusters table. For example, an entry in a clusters table may contain one or more user identifiers and transaction amounts associated with a transaction date, time, merchant and location. In one or more embodiments, the transaction data and time need not be exactly the same (e.g., approximately the same time plus or minus a few minutes) to account for differences between the manner in which the data was reported. In one embodiment, the clusters table may contain some or all of the following information:
<list of user identifiers, transaction date, transaction time, merchant identifier, merchant location, transaction amount, general description>

At step 404, the transaction data, whether maintained in one or more tables (e.g., clusters table) or other form, may be mined to compare a first transaction to other transactions such as e.g., the other transactions in the associated group/cluster that may have been created in step 402.

In one embodiment, the data may be mined to determine two types of events: 1) co-occurrence of transactions; and 2) bill-splitting. The inventors have determined that these two events may provide connections between the transactions and therefore the users associated with the transactions.

The first event, co-occurrence of transactions, may be identified as the occurrence of transactions (e.g., purchases) at the same merchant at approximately the same time by two different users. In one embodiment, the number of times there was a co-occurrence of transactions between the same users may be compared to a predetermined threshold. If the number of times there was a co-occurrence of transactions between the same users exceeds the threshold, then the users are connected in the social graph (described below). In one embodiment, for merchants having different branches or locations (e.g., Starbucks®), the transactions must take place in the same branch (e.g., as may be determined by the input transaction location data) and not only the same merchant. In one or more embodiments, online transactions and merchants would not be considered in determining whether a co-occurrence event has occurred. In one embodiment, the co-occurrence of transactions may be considered a weak connection between the users because while the users share a common interest (e.g., coffee), it remains possible that the users where at the same location by happenstance). In one embodiment, frequent co-occurrence events may be determined to be a moderate connection.

The second event, bill-splitting, may be identified as an occurrence of two users making a purchase at the same place, at the same time and for approximately the same amount. The inventors have determined that two factors may be used to ensure that the transactions resulted from bill-splitting, and are not just a coincidence: 1) unpopular transaction amount; and 2) the number of times the two users appear to split a bill. It should be appreciated that the strength of the connection between the users will be a function of both these factors. An unpopular transaction amount may be determined by comparing the amount of the transaction to typical transaction amounts at the merchant. For example, if the process 302 identifies thousands of purchases for $4.50 at a coffee shop, it may be determined that the transaction amount is e.g., the price of cup of coffee and most likely not the result of bill-splitting. However, if the process 302 identifies two individuals making a purchase for $17.25 at a restaurant and identifies only a few other purchases for that exact amount. then it may be determined that the transaction amount is more likely to be a split bill. In one embodiment, bill-splitting may be considered a strong connection between the users because it may be a clear indication that the users have a good connection (e.g., they intentionally dined together).

Accordingly, at step 406, the process 302 determines if the compared transactions may be a co-occurrence event as discussed above. If it is determined that the compared transactions may be a co-occurrence event, the process 302 continues at step 408 where a connection between the users may be establish. As noted above, in one embodiment, the connection between the users may be deemed a weak connection. After step 408, the process 302 continues at step 414 where relevant connection information is recorded/updated in a table that may be representative of the social graph being generated ("social graph table"), as discussed below in more detail.

If it is determined at step 406 that the compared transactions are not a co-occurrence event, the process 302 continues at step 410 where the process 302 determines if the compared transactions are a bill-splitting event. If it is determined that the compared transactions may be a bill-splitting event, the process 302 continues at step 412 where a connection between the users may be establish. As noted above, in one embodiment, the connection between the users may be deemed a strong connection. After step 412, the process 302 continues at step 414 where relevant connection information is recorded/updated in the social graph table.

For example, at step 414, the process 302 may collect and store in the social graph table at least the following data: <user identification (of the first transaction), user identification (of the second transaction, connection strength>

In one or more embodiments, the connection strength may by one or more of weak, moderate, strong, very strong, to name a few. In one or more embodiments, additional information may be retained and each entry in the social graph table may include:
<user identification (of the first transaction), user identification (of the second transaction, connection type, connection strength>

In one embodiment, the connection type may include friends, casual acquaintance, not friends, to name a few. The connection type may be determined by e.g., the frequency of shared events (e.g., the more the users split a bill between them, the more likely they are friends), the manner in which the bills are split (e.g., a 50/50 split may indicate that the users are friends, while a 70/30 split may indicate that the users are not friends or are merely acquaintances), and where the transactions occurred.

In one embodiment, rather than maintaining a relational table, the connection information may be stored in suitable graph-type database. As such, the principles disclosed herein are not limited to the specific examples set out herein.

At step 416, the process 302 determines if there are more transactions to process. If it is determined that there are more transactions to process, the process 302 continues at step 404 (discussed above). Otherwise, the process 302 continues as step 418, where the process 302 may generate, store and output a social graph that may contain nodes associated with various users of the system 100 and connections (e.g., weak, moderate, strong, very strong, etc.) between some or all of the nodes. In one embodiment, the social graph may be output as part of a graphical user interface displayed on one or more devices of the system 100. In one embodiment, the social graph table and or the social graph may be analyzed for various purposes such as e.g., collaborative filtering and user profiling (as explained below with reference to FIG. 6).

Figure 5:
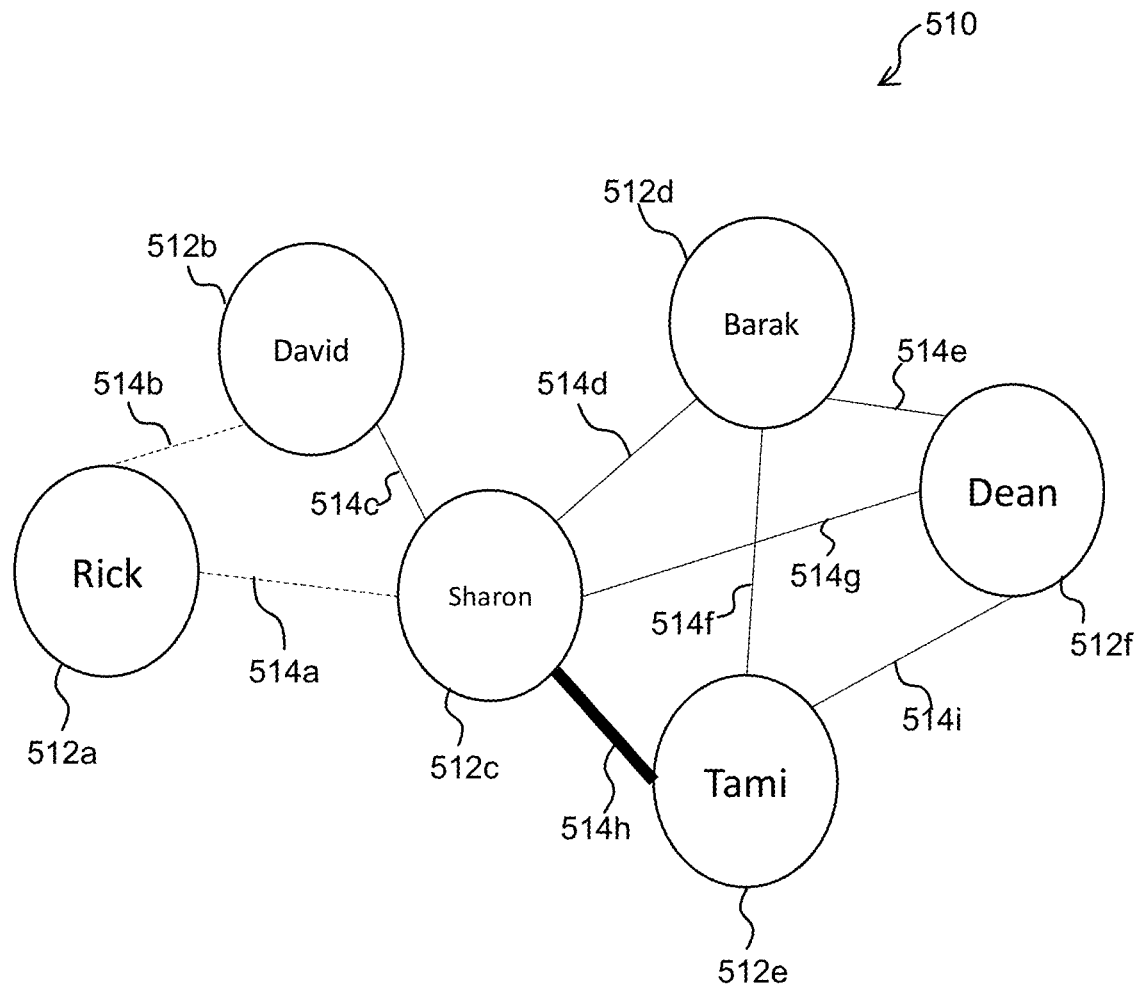
FIG. 5 shows an example of a social graph created according to an example of the disclosed principles.

FIG. 5 shows an example of a social graph 510 created according to the disclosed principles. The illustrated graph 510 contains six nodes 512a, 512b, 512c, 512d, 512e, 512f respectively associated with users Rick, David, Sharon, Barak, Tami and Dean. As shown in the example graph 510, the first node 512 (Rick) has respective weak connections 514a, 514b (shown as dashed lines) to the second node 512b (David) and third node 512c (Sharon). The second node 512b (David) also has a moderate connection 514c to the third node 512c (Sharon). The third node 512c (Sharon) also has respective moderate connections 514d, 514g to the fourth node 512d (Barak) and sixth node 512f (Dean) and a strong connection 514h to the fifth node 512e (Tami). The fourth node 512d (Barak) also has respective moderate connections 514e, 514f to the fifth node 512e (Tami) and sixth node 512f (Dean). The fifth node 512e (Tami) also has a moderate connection 514i to the sixth node 512f (Dean). It should be appreciated that the illustrated social graph 510 is just an example and that it, and the underlying data discussed below, are mere not limiting examples of the disclosed principles.

The example social graph 510 was generated based on a simulated input data set shown in the following table:

| user | date | time | place | longitude and latitude | amount |
|---|---|---|---|---|---|
| David | 2-Jun-19 | 13:00 | McDonalds | 41°24'12.2"N 2°10'26.5"E | 45 |
| Sharon | 2-Jun-19 | 13:00 | McDonalds | 41°24'12.1"N 2°10'26.2"E | 45 |
| Rick | 2-Jun-19 | 13:01 | McDonalds | 41°24'12.3"N 2°10'26.3"E | 59 |
| Barak | 3-Jun-19 | 20:00 | Etsy | 41°24'12.7"N 2°10'22.5"E | 30 |
| Dean | 3-Jun-19 | 20:00 | Etsy | 41°24'12.8"N 2°10'22.4"E | 30 |
| Tami | 3-Jun-19 | 20:01 | Etsy | 41°24'12.7"N 2°10'22.5"E | 30 |
| Sharon | 3-Jun-19 | 20:00 | Etsy | 41°24'12.8"N 2°10'22.4"E | 30 |
| Sharon | 6-Jun-19 | 20:50 | Madrid | 21°24'12.8"N 2°12'22.4"E | 100 |
| Tami | 6-Jun-19 | 20:50 | Madrid | 21°24'12.7"N 2°12'22.5"E | 100 |

In the illustrated example, the input data set was mined (e.g., during step 402 of process 302) to create a clusters table shown below:

| users list | date | time | place | longitude and latitude | amounts |
|---|---|---|---|---|---|
| David, Sharon, Rick | 2-Jun-19 | 13:00 | McDonalds | 41°24'12.2"N 2°10'26.5"E | 45, 45, 59 |
| Barak, Dean, Tami, Sharon | 3-Jun-19 | 20:00 | Etsy | 41°24'12.7"N 2°10'22.5"E | 30, 30, 30, 30 |

-continued

| users list | date | time | place | longitude and latitude | amounts |
|---|---|---|---|---|---|
| Sharon, Tami | 6-Jun-19 | 20:50 | Madrid | 21°24'12.8"N 2°12'22.4"E | 100, 100 |

The clusters table was then processed (e.g., by steps 406-418 of process 302) to determine the connections between the users and the strengths of the connections. In the illustrated example, three connection strengths were used: weak (e.g., connections 514a, 514b), moderate (e.g., connections 514c, 514d, 514e, 514f, 514g, 514i), and strong (e.g., connection 514h). Connection types and other features discussed herein were not included in the illustrated example.

Figure 6:
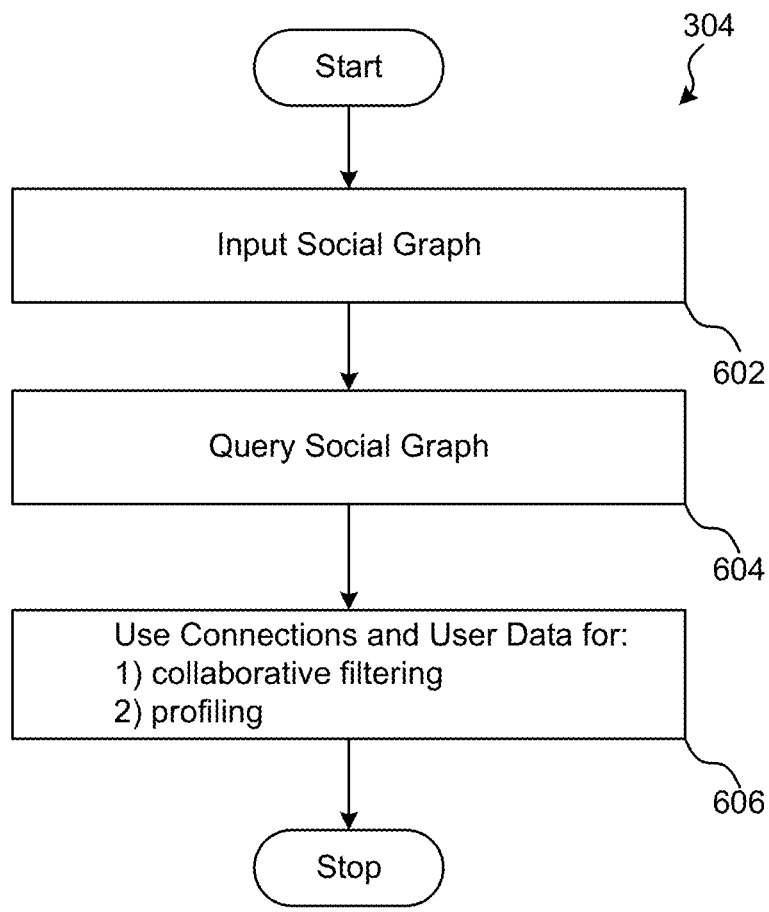
FIG. 6 shows an example social graph analysis and use process that may be utilized in the process for constructing and using a financial transaction-based social graph shown in FIG. 3.

FIG. 6 shows an example social graph analysis and use process 304 that may be utilized in the process 300 for constructing and using a financial transaction-based social graph shown in FIG. 3. The process 304 may begin by inputting the social graph and or its social graph table at step 602. Once input, the social graph and or its social graph table can be queried at step 604 by any known process. As can be appreciated, once the financial transaction-based social graph (e.g., graph 310) is generated and input, there are many ways in which it or its associated social graph table may be utilized. For example, and as shown in step 606, the connections and collected user data may be used for: 1) collaborative filtering (e.g., product/service propagation); and 2) user segmentation and profiling.

For example, the process 304 may implement collaborative filtering by utilizing the social graph to determine how likely a user is to be interested in an offer, based on the purchase behavior of others in the graph connected to the particular user. For example, the process 304 may review a user's friends or social connections to others in the social graph to determine the interests of the user through the behavior of the friends/social connections. The process 304 may use the social graph for profiling and segmenting users in a particular manner and then using the profile/segmentation to target specific advertisements, product offerings, coupons, etc. in an efficient and most likely successful manner. For example, the process 304 could determine that a user has few friends, but likes to dine at expensive restaurants. As such, the process at step 606 could provide advertisements and or other offers to expensive restaurants in the proximity of the user. Because the collaborative filtering and user profiling are based on financial transactions of connected individuals, and of the user itself, it is more likely that the targeted efforts will be successful.

As can be appreciated, the principles disclosed herein can narrow down thousands if not millions of transactions to a small subset of data representing a financial transaction-based social graph. Accordingly, the disclosed principles may have small memory storage requirements, particularly when compared to the mass storage the information service provider requires to maintain each individual transaction. Moreover, because only a small subset of data representing the financial transaction-based social graph is used by the disclosed principles, processing load is drastically reduced throughout the disclosed process. Another benefit of the disclosed principles is that they are useful as inputs to any other machine learning pipeline. These are major improvements in the technological art as it improves the functioning of the computer and is an improvement to the technology and technical fields of social graph creation and use (e.g., collaborative filtering and user profiling).

While various embodiments have been described above, it should be understood that they have been presented by way of example and not limitation. It will be apparent to persons skilled in the relevant art(s) that various changes in form and detail can be made therein without departing from the spirit and scope. In fact, after reading the above description, it will be apparent to one skilled in the relevant art(s) how to implement alternative embodiments. For example, other steps may be provided, or steps may be eliminated, from the described flows, and other components may be added to, or removed from, the described systems. Accordingly, other implementations are within the scope of the following claims.

In addition, it should be understood that any figures which highlight the functionality and advantages are presented for example purposes only. The disclosed methodology and system are each sufficiently flexible and configurable such that they may be utilized in ways other than that shown.

Although the term "at least one" may often be used in the specification, claims and drawings, the terms "a", "an", "the", "said", etc. also signify "at least one" or "the at least one" in the specification, claims and drawings.

Finally, it is the applicant's intent that only claims that include the express language "means for" or "step for" be interpreted under 35 U.S.C. 112(f). Claims that do not expressly include the phrase "means for" or "step for" are not to be interpreted under 35 U.S.C. 112(f).

What is claimed is:

1. A computer implemented method for generating and using a financial transaction-based social graph, said method being performed on a computing device, said method comprising:
inputting financial transaction data associated with a plurality of users;
organizing the input financial transactions based on an approximate time and location of the transactions;
filtering the organized input financial transactions to extract data that identifies one or more users who experienced a same transaction event, the filtering comprising:
comparing respective transactions at a same first merchant at approximately a same time, and
determining if the users split a payment of a bill at the first merchant based on an association of the payment with a first set of transactions having a first same purchase amount, the number of transactions in the first set of transactions being lower than the number of transactions in a second set of transactions having a second same purchase amount;
determining a connection between the one or more users when it is determined that the one or more users experienced the same transaction event;
generating the financial transaction-based social graph using data that identifies the users that experienced the same transaction event and a connection strength between the users that experienced the same transaction event;

querying the financial transaction-based social graph; and using the connections and user data in the financial transaction-based social graph in one or more of a collaborative filtering process or a process for profiling one or more users for a product offering.

2. The method of claim 1, wherein filtering the organized input financial data to extract the data that identifies one or more users who experienced the same transaction event comprises:

determining if the users experienced a co-occurrence of transactions at the same first merchant at approximately the same time.

3. The method of claim 2, further comprising:

determining a number of times the users experienced the co-occurrence of transactions at the same first merchant at approximately the same time; and determining the connection strength based on the determined number of times the users experienced a co-occurrence of transactions at the same first merchant.

4. The method of claim 2, further comprising:

determining a number of times the users experienced a co-occurrence of transactions at a same second merchant at approximately a same time; and determining the connection strength based on the determined number of times the users experienced a co-occurrence of transactions at the same first and second merchants.

5. The method of claim 1, further comprising:

determining a number of times the users split the payment of a bill at the first merchant; and determining the connection strength based on the determined number of times the users split the payment of a bill at the first merchant.

6. The method of claim 5, further comprising:

determining a number of times the users split the payment of a bill at a second merchant; and determining the connection strength based on the determined number of times the users split the payment of a bill at the second merchant.

7. The method of claim 1, further comprising:

storing in a social graph table data that identifies a connection type for the users that experienced the same transaction event.

8. A system for generating and using a financial transaction-based social graph, said system comprising:

a first computing device connected to a database comprising financial transaction data associated with a plurality of users, the first computing device configured to:

input the financial transaction data associated with the plurality of users;

organize the input financial transactions based on an approximate time and location of the transactions;

filter the organized input financial transactions to extract data that identifies one or more users who experienced a same transaction event, the filtering comprising:

comparing respective transactions at a same first merchant at approximately a same time, and determining if the users split a payment of a bill at the first merchant based on an association of the payment with a first set of transactions having a first same purchase amount, the number of transactions in the first set of transactions being lower than the number of transactions in a second set of transactions having a second same purchase amount;

determine a connection between the one or more users when it is determined that the one or more users experienced the same transaction event;

generate the financial transaction-based social graph using data that identifies the users that experienced the same transaction event and a connection strength between the users that experienced the same transaction event;

query the financial transaction-based social graph; and use the connections and user data in the financial transaction-based social graph in one or more of a collaborative filtering process or a process for profiling one or more users for a product offering.

9. The system of claim 8, wherein the first computing device configured to filter the organized input financial data to extract the data that identifies one or more users who experienced the same transaction event by:

determining if the users experienced a co-occurrence of transactions at the same first merchant at approximately the same time.

10. The system of claim 9, wherein the first computing device is further configured to:

determine a number of times the users experienced the co-occurrence of transactions at the same first merchant at approximately the same time; and determine the connection strength based on the determined number of times the users experienced a co-occurrence of transactions at the same first merchant.

11. The system of claim 9, wherein the first computing device is further configured to:

determine a number of times the users experienced a co-occurrence of transactions at a same second merchant at approximately a same time; and determine the connection strength based on the determined number of times the users experienced a co-occurrence of transactions at the same first and second merchants.

12. The system of claim 8, wherein the first computing device is further configured to:

determine a number of times the users split the payment of a bill at the first merchant; and determine the connection strength based on the determined number of times the users split the payment of a bill at the first merchant.

13. The system of claim 12, wherein the first computing device is further configured to:

determine a number of times the users split the payment of a bill at a second merchant; and determine the connection strength based on the determined number of times the users split the payment of a bill at the second merchant.

14. The system of claim 8, wherein the first computing device is further configured to:

store data that identifies a connection type for the users that experienced the same transaction event in a social graph table.

\* \* \* \* \*